May 6, 1930.                    A. KORONSKI                    1,757,722
              WEIGHT READING AND PRINTING MECHANISM FOR SCALES
                    Filed July 21, 1922      5 Sheets-Sheet 1

INVENTOR
Andre Koronski
BY
Cyrus N. Anderson
ATTORNEY

May 6, 1930. A. KORONSKI 1,757,722
WEIGHT READING AND PRINTING MECHANISM FOR SCALES
Filed July 21, 1922 5 Sheets-Sheet 2

INVENTOR
André Koronski
BY
Cyrus N. Anderson
ATTORNEY

May 6, 1930. A. KORONSKI 1,757,722
WEIGHT READING AND PRINTING MECHANISM FOR SCALES
Filed July 21, 1922 5 Sheets-Sheet 4

INVENTOR
André Koronski
BY
Cyrus N. Anderson
ATTORNEY

May 6, 1930.　　　A. KORONSKI　　　1,757,722
WEIGHT READING AND PRINTING MECHANISM FOR SCALES
Filed July 21, 1922　　　5 Sheets-Sheet 5

INVENTOR
André Koronski
BY
ATTORNEY

Patented May 6, 1930

1,757,722

UNITED STATES PATENT OFFICE

ANDRÉ KORONSKI, NOW BY JUDICIAL CHANGE OF NAME ANDREW KING, OF NARBERTH, PENNSYLVANIA

WEIGHT READING AND PRINTING MECHANISM FOR SCALES

Application filed July 21, 1922. Serial No. 576,468.

My invention relates to mechanisms for reading a scale and printing the weight on a suitable record in such a way as to entirely eliminate mental operations and the mistakes incidental to the reading of the scale by eye.

It also relates to mechanisms for the purpose stated which shall so transfer the weight to type wheels or the like that the same setting can be used to control multiplying mechanism to multiply the weight by the price per pound.

The object of this invention is to provide means for reading the registration of a scale and printing the weight on a ticket or other suitable record. The special object is to provide such a means for the purposes stated as shall require no mental operations and thus entirely eliminate the human equation from the reading of the weight, i. e., to provide a means which shall be entirely mechanical and automatic so that the judgment of the operator shall be entirely eliminated. All that is required in order to operate this device is to put the article to be weighed on the weighing platform of the scale and actuate a lever or the like and the mechanism described in this specification reads the scale, sets type to correspond to the reading and prints the weight on a ticket or other record.

A further object is to provide means for the purpose stated which, when the type wheels are set to the weight, will control mechanism which will multiply the weight by the price per pound and in addition to the weight, print the price per pound and the product of the weight by the price per pound (or the total cost of the article weighed) also on the record.

This multiplying mechanism is not shown in the accompanying drawings as it forms part of another invention which will be covered in an application to be made later.

Another object is to provide means for the purpose stated which shall not put a load on the weighing mechanism and which will not, therefore, interfere with the accuracy of the scale.

Another object is to provide means for the purpose stated of which the operating parts are light so that the operation thereof will not rack the scale.

Another object is to provide means for the purpose stated which shall be positive in its action and as nearly independent of springs as practicable.

It will be seen in the accompanying drawings that, for the most part, the frame of the scale, the supports for the mechanism and the mechanism for the scale itself have been omitted as they are not essential to the understanding of this invention. The scale mechanism proper is not involved and is not shown as this device covers only mechanism for reading the scale and for printing the weight and it can therefore be applied to any scale of the type known as "automatic." i. e., that in which the placing of a weight on the scale causes the deflection or angular movement of a pointer of similar device. It can also be applied to the reading of any deflectable member whether used on a scale or elsewhere. It is not, however, necessary that these deflections be equal or that they have the same relation to the weight on all parts of the dial, as the mechanism shown can be easily modified to suit conditions.

I attain these objects by the means shown in the accompanying drawings and in which.

Referring to Figs. 1, 3, 4 and 6, 1 is a rack which is actuated by the scale mechanism and which in turn actuates, thru the gear 1ª, the pointer assembly 2 which is pivoted in the supports 3 and 4. This pointer assembly is perfectly free to rotate the same as the pointer in an ordinary scale. Owing to the position of the supports in this scale the pointer assembly can make only about 9/10 of a revolution and in the scale shown this corresponds to 30 pounds.

Figures 1, 2:
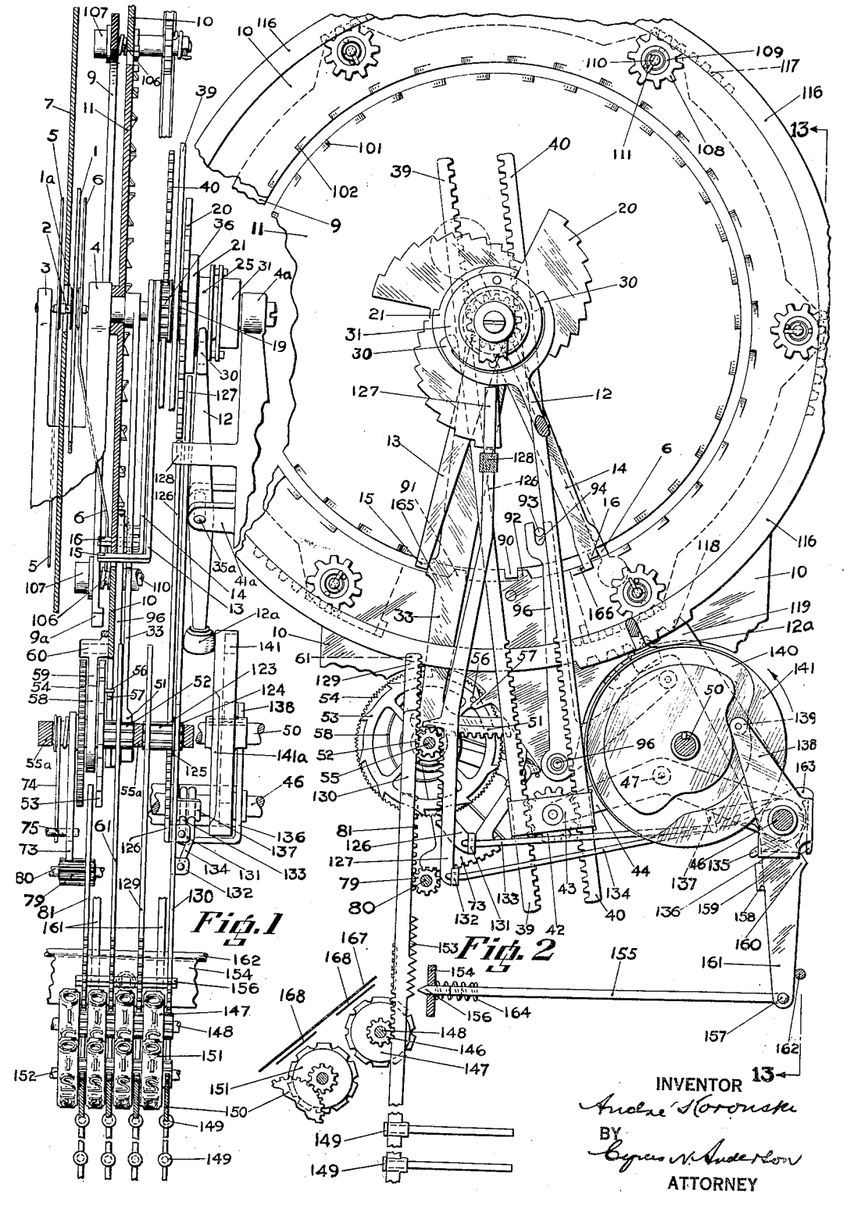
Fig. 1 is a side view of Fig. 2 with such parts cut away as would make the drawings too complicated.
Fig. 2 is a rear view of the mechanism. All the supports for the various parts have been cut away for greater clearness.
Figures 3, 4, 5:
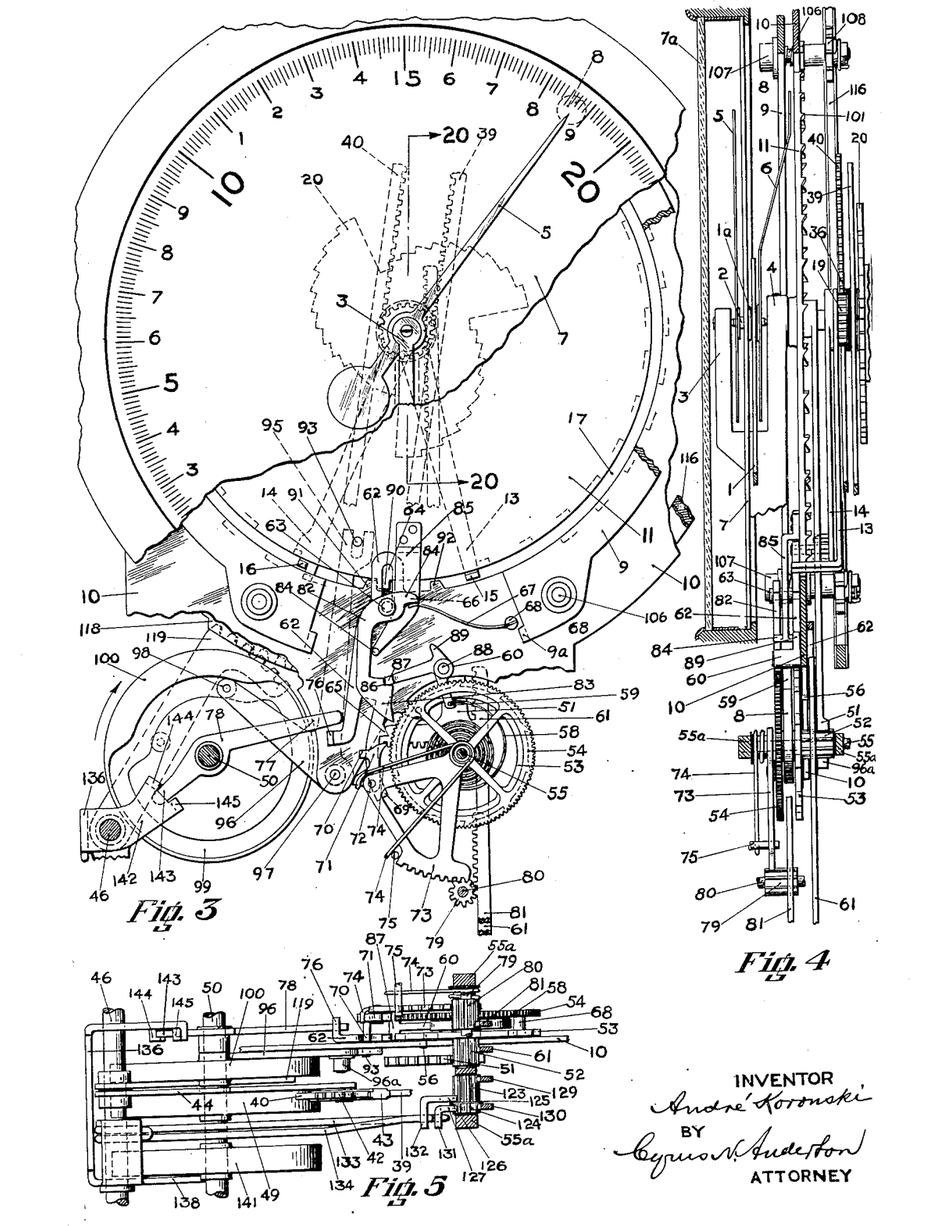
Fig. 3 is a front view of part of a scale with the mechanism in question attached to it, certain parts having been cut away to show the underlying mechanism.
Fig. 4 is a side view of Fig. 3 with some parts omitted.
Fig. 5 is a bottom view of parts of the mechanism.

Rigidly attached to the pointer assembly 2 are the balanced pointers 5 and 6 of which the pointer 5 shows the weight on the dial 7 in the usual way. The pointer 6 is provided with an enlarged end 8 and is bent as shown so that the end 8 is located between the clamping ring 9 and the plate 10 but without touching either. The relative position of the end 8 of the pointer 6 to the clamping ring 9 and plate 10 are clearly shown in Fig. 4. From the above it will be seen that when an article is placed on the scale, the pointers 5 and 6 turn thru a certain arc in exactly the same way as in an ordinary scale and without doing any more work. The only difference between the pointer assembly shown here and the pointer of a regular scale is the addition of the pointer 6, but as this is light and fully balanced it does not add to the load. In Fig. 2 the pointer 6 is shown in its zero position. In Fig. 3 both pointers are shown in the position corresponding to 18.70 lbs.

Pivoted to the support 4 is the reader disc 11 which is free to turn thru an arc equal to 9/10 lb. on the scale dial. Located in the same plane and provided with a circular opening which surrounds the said disc 11 so as to leave a space 17 between them is the plate 10 which is rigidly attached to the scale frame. Pivoted between the disc 11 and the support 4ª are the readers 13 and 14 which are provided with fingers 15 and 16 respectively which pass thru the slot 17 between the plate 10 and the disc 11 but without touching either. These fingers 15 and 16 extend into the path of the pointer 6.

The reader 14 is rigidly attached to the sleeve 18 (see Fig. 20) which is integral with the gear 19 to which are rigidly attached the snail 20 and the friction disc 22 by means of the screws 23. The snail 21 is attached to the snail 20 by the screws 23ª. The snail 21 is provided with a collar 24 which engages and under which fits loosely one lip of the cup 25 which is pivoted and also slideable on the sleeve 26 and which is provided with a friction disc 27 rigidly attached thereto by the screws 28. The cup 25 is also provided with the pins 29 which pass thru the holes in the cup 31. Attached at one end to the cup 25 and at the other to the cup 31 is the spring 32 which is so tensioned that it causes the pins 29 always to ride against the same side of the holes so as to prevent relative rotary play of the cups 25 and 31. The spring 32 also tends to push the cup 25 and the cup 31 apart.

The cup 31 is rigidly attached to the sleeve 26 which is integral with the segment lever 33 and these are all mounted on the screw 34 which is carried in the supports 4 and 4ª and it is locked to the support 4ª by the set screw 34ª all as shown. Pivoted on the sleeve 18 is the gear 36 which is integral with the reader 13 which is free to rotate on the sleeve 18 independently of the reader 14, etc.

Figures 18, 19, 20, 21, 22:
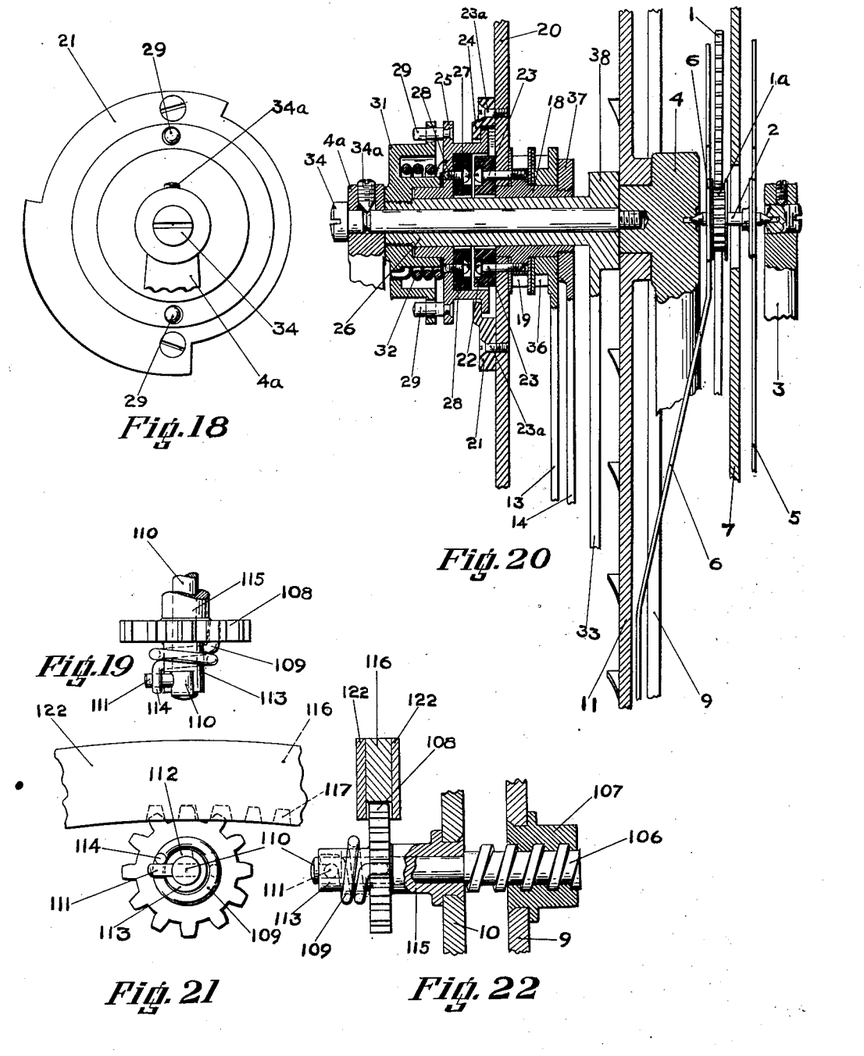
Fig. 18 is a view of the end of Fig. 20 showing the snail 21.
Figs. 19 and 21 are views of the clamping screw 106 and its driving gear.
Fig. 20 is a section on the line 20—20 in Fig. 3 with some parts omitted.
Fig. 22 is a side view of the gear 108 and a section thru the bushing 107.

As shown in Fig. 20 the spring 32 is fully compressed. This is the unlocking or normal position with the faces of the friction discs 22 and 27 out of contact. The sleeve 18 is capable of rotation on the sleeve 26 and also of longitudinal motion along the said sleeve from the position shown in Fig. 20 to that where the part 37 integral with the reader 14 contacts with the shoulder 38 integral with the segment lever 33. The cup 25 is normally held in the position shown in Fig. 20 by a lever 12 to be described later and at these times it will be seen that the reader 14 together with the parts 18, 20, 21 and 22 which are rigidly attached thereto are free to turn independently on the spindle 26 integral with the segment lever 33 and the parts 25, 27, 31, etc. which are attached to it. When, however, the cup 25 is allowed to move toward the right in Fig. 20 under the influence of the spring 32 the friction discs 22 and 27 come in contact and the attached parts move along the sleeve 26 until the parts 37 and 38 contact at which time the lever 14 and the segment lever 33 are locked together by the friction of the said discs 22 and 27 pressed together by the spring 32.

The lever 12 engages the outer lip of the cup 25 by means of the arms 30 (see Figs. 1 and 2) and is pivoted at the point 35ª to the bracket 41ª integral with the support 4ª. The roller 12ª is pivoted to the lower end of said lever and engages a cam depression 141ª in the disc 141 at certain times.

Figures 6, 7, 8:
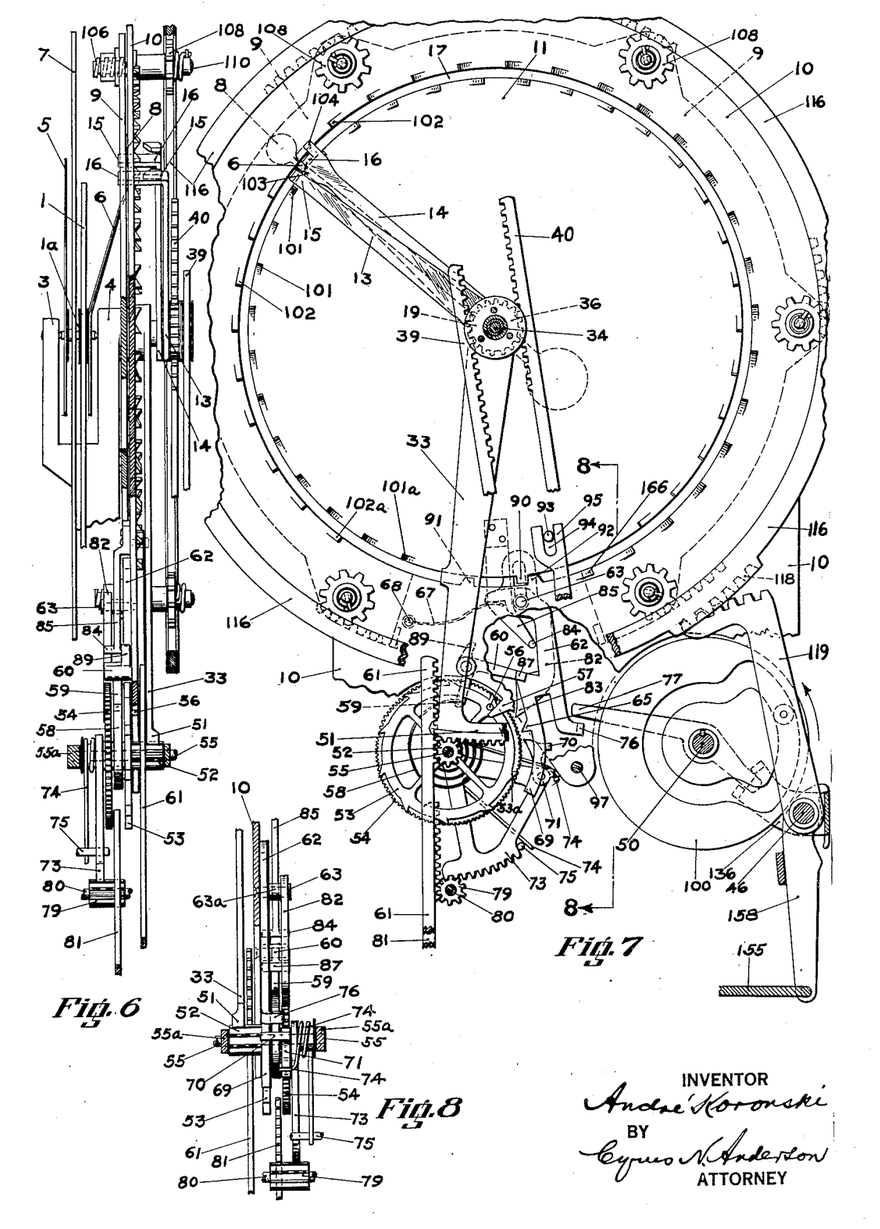
Fig. 6 is a side view of Fig. 7 with parts cut away.
Fig. 7 is a rear view of the scale mechanism showing the scale pointers in their deflected position as when a load is placed on the weighing platform with the readers in the position they assume when reading the weight.
Fig. 8 is a view in the general direction of the line 8—8 in Fig. 7.

Engaging the gears 19 and 36 are the racks 39 and 40 respectively. Figs. 2, 3 and 7. Both the racks 39 and 40 are provided with an additional set of teeth at their lower ends which engage the gear 42 (see Figs. 2, 11 and 12) said racks being kept in engagement with said gear by the guard 43, the gear 42 and the guard 43 being pivoted to the end of the lever 44 at the point 45. The lever 44 is pivoted on the rod 46 and is provided with a roller 47 which rides in the cam groove 48 in the disc 49 which is keyed to the shaft 50 by which it is actuated. The gear 42 is of the same size as the gears 19 and 36, tho not necessarily so.

The segment lever 33 is provided with a segment 51 which engages the gear 52 and the ratio of the pitch diameter of the segment 51 to the pitch diameter of the gear 52 is such that the gear 52 will make one revolution if the said segment 51 is rotated thru an arc equal to one pound on the scale dial. Rigidly attached to the gear 52 are the wheels 53 and 54 all of which are pivoted on the rod 55. The wheel 53 is provided with nine teeth spaced one tenth of a revolution apart with one space left blank. These teeth are accurately spaced and carefully shaped to a sharp edge. The wheel 54 is provided with one hundred V-shaped equal teeth. Figs. 1, 3 and 7. Rigidly mounted in the wheel 53 is the pin 56 which contacts with the stop 57 integral with the plate 10. This prevents the wheels 53 and 54 from rotating farther backward than their zero positions. The spring 58 is attached at one end to the hub of the wheels 53 and 54 and at the other end to the end 59 of the latch 60 and tends to counterbalance the weight of the rack 61 and the attached parts and to hold the segment 51 into firm engagement with the gear 52 so as to eliminate lost motion. It also holds the latch 60 in position.

Referring to Figs. 3, 5, 6, 7 and 8, in the same plane as the wheel 53 is located the lever 62 which is mounted on the pin 63 in such a way as to be capable of rotation and also of vertical motion to the extent of the slot 64 on the said pin 63. The vertical travel is exactly equal to 9/10 of the distance between the teeth on the wheel 53. The lever 62 is provided with a pawl point or tooth 65 which is carefully shaped to a sharp edge at the end and which is so located with reference to the wheel 53 that the distance from the lower end of the tooth 65 to the first tooth 53ª of the wheel 53 (Fig. 7) is as accurately as possible equal to 9/10 of the distance between the teeth of said wheel 53. Normally, however, the tooth 65 is held out of the path of the teeth of the wheel 53. Integral with the lever 62 is the finger 66 which is engaged by one of the fingers of the spring 67 (of which there are two) and which is rigidly mounted in the stud 68 rigidly attached to the plate 10. Also integral with the lever 62 is the curved part 69 which rides under the laterally extending finger 70 of the pawl 71 so as to hold said pawl out of engagement with the teeth of the wheel 54. The pawl 71 is pivoted at the point 72 to the segment 73 which is pivoted on the rod 55. Figs. 3, 4 and 5. The spring 74 serves to hold the segment 73 against the stop 75 and also engages the pawl 71 to rotate said pawl when it is released. The lever 62 is also provided with a laterally projecting finger 76 which lies in the path of the end 77 of the lever 78.

The segment 73 engages the gear 79 pivoted on the rod 80 and their gear ratio is 1 to 10. Engaging the gear 79 is the rack 81 which sets one of the type wheels.

In the plane of the wheel 54, pivoted on the pin 63 and held in lateral position thereon by the sleeve 63ª is the pawl 82 which is provided with an end 83 adapted to engage the teeth of the wheel 54, it is also provided with an extension 84 which engages the other finger of the spring 67 and this tends to rotate the said pawl 82 about the pin 63.

Contacting with both the lever 62 and the pawl 82 is the end 84 of the piece 85 which is rigidly attached to the disc 11. This prevents the said lever and pawl from rotating under the action of the spring 67 and holds them out of the path of the teeth in the wheels 53 and 54. Engaging the notches 86 in the lever 62 and the pawl 82 is the end 87 of the latch 60 which is pivoted on the pin 88 mounted on the plate 10. The latch 60 is also provided with a finger 89 which is adapted to be engaged by the end 84 of the piece 85 to release the said latch 60.

Figures 9, 10, 11, 12, 13, 14, 15, 16, 17:
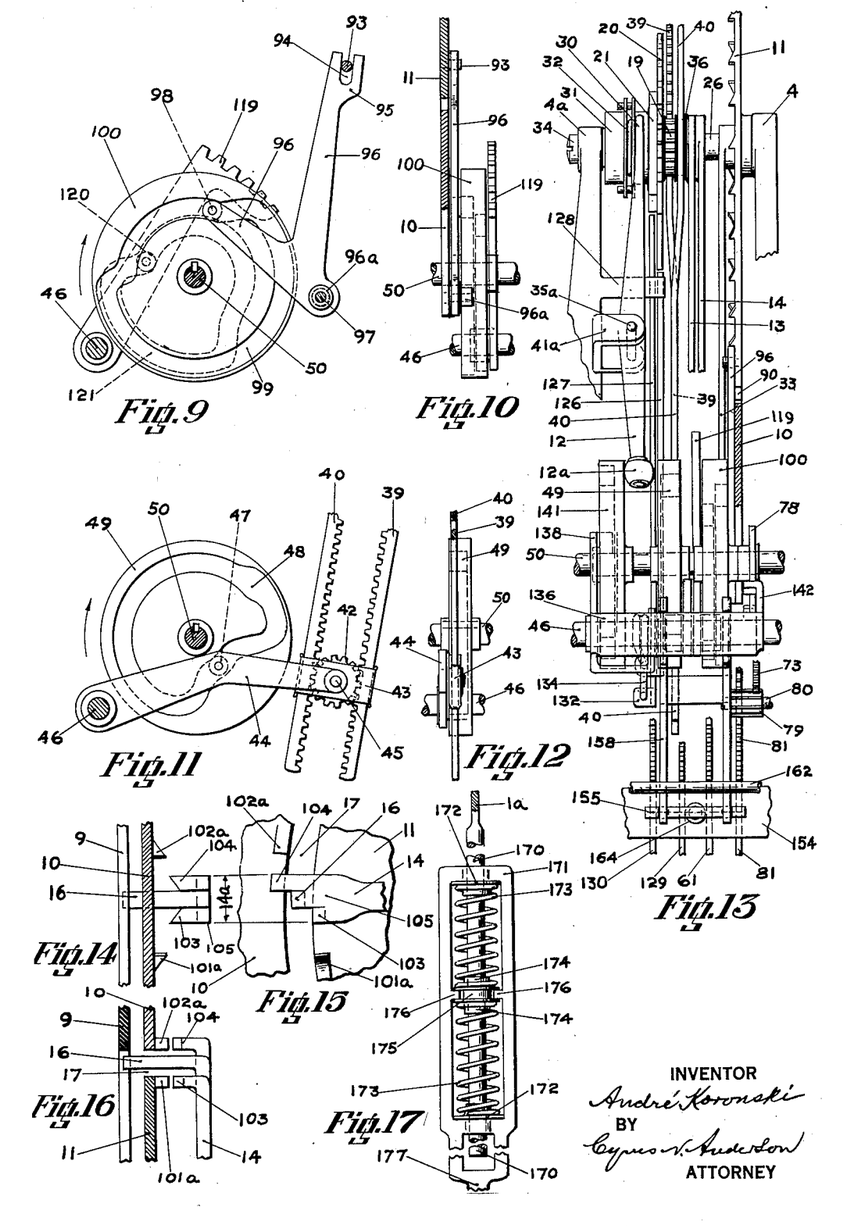
Figs. 9, 10, 11 and 12 are various views of the cam mechanisms which control the motion of the various parts when reading the weight.
Fig. 13 is a view on the line 13—13 in Fig. 2.
Figs. 14, 15 and 16 are views of the reader 14 and show its relation to the disc 11 and the plate 10.
Fig. 17 shows a spring coupling for the rack 1.

As already stated, the disc 11 is pivoted on the support 4 and is capable of limited rotation thereon, this rotation being limited by the lug 90 integral with said disc 11, the lug 90 being located between the lugs 91 and 92 integral with the plate 10. Figs. 2, 3 and 7. Rigidly mounted on the disc 11 is the pin 93 which engages the slot 94 in the end 95 of the lever 96 which is mounted on a bushing 96ª and is pivoted at the point 97 to the plate 10. The other end of the lever 96 is provided with a roller 98 which rides in the cam groove 99 in the disc 100 which is keyed to the shaft 50. Figs. 3 and 9. It is thru the lever 96 that the disc 11 is operated.

Referring to Figs. 2, 6, 7, 14, 15 and 16, the disc 11 is provided with a set of teeth 101 which have one face perpendicular to the disc 11 and the other curved so as to give the tooth a sharp edge. On the plate 10 is a similar set of teeth 102 which face in the opposite direction to the teeth on the disc 11. These teeth are spaced apart a distance equal in arc to that corresponding to 1 lb. on the scale dial and when the disc 11 is in its normal position as shown in Fig. 7 the relation between the position of the teeth on the disc 11 and the plate 10 is such that the distance between a tooth 101$^a$ and a tooth 102$^a$ is equal to 9/10 of a pound on the scale dial plus the width 14$^a$ of the end 105 of the reader 14 shown in Figs. 14 and 15.

The end 105 of the reader 14 is provided with two teeth 103 and 104 of about the same shape as the teeth 101, the tooth 103 lying in the plane of the teeth 101 and the tooth 104 lying in the plane of the teeth 102 with their flat faces disposed in the directions shown in Figs. 14 and 15.

When in its normal position, the end 105 of the reader 14 is located so that the teeth 103 and 104 clear the teeth 102 and 101 and the reader can be freely rotated. When the reader 14 is moved so that the teeth 103 and 104 come into the path of the teeth 101 and 102 and the disc 11 is rotated 9/10 of a pound as previously described the end 105 will just fit into the space left between the teeth 101 and 102 when the disc 11 is in its rotated position. It is impossible for any of these teeth to jam or strip by the motion of the disc 11 because the motion of the disc 11 is 9/10 of one space and therefore the end 105 cannot drop in between two teeth which do not have sufficient distance between them to allow the disc 11 the free motion 9/10 lbs. as explained.

As before outlined, the clamp ring 9 and the plate 10 clamp the end 8 of the pointer 6 between them at certain times and the clamping is done by means of the screws 106 which are threaded into the bushings 107 which are rigidly attached to the ring 9. The screws 106 are operated by the gears 108 thru the springs 109. Figs. 19, 21 and 22. Integral with the screw 106 is the spindle 110 which is provided with a hole at the end into which is set the pin 111 which rides in the notch 112 in the sleeve 113 integral with the gear 108. The sleeve 113 pivots on the spindle 110 and is capable of rotation thereon to the extent permitted by the pin 111 and the notch 112. One end of the spring 109 hooks into a hole in the gear 108 and the other end 114 engages the pin 111. The spindle 110 is pivoted in the bushing 115 which is rigidly attached to the plate 10.

The pitch of the screw 106 and the rotation of the gears 108 by the ring 116 are such that the clamp ring 9 is drawn closer to the plate 10 than the thickness of the end 8 of the pointer 6 and the interposition of the springs 109 in the drive allows the clamp ring 9 to take up and clamp the end 8 to better advantage. As shown in the drawings, the end 8 is simply a flat disc integral with the end of the pointer 6, and the ring 9 and the plate 10 have smooth clamping faces but it is evident that these faces could be milled with radial or other milling and the disc could be curved slightly or milled also to increase the grip. The clamping faces could also be otherwise treated to increase their friction if desired. It is also self evident that numerous other means of temporarily locking the pointer 14 in the deflected position could be employed.

The ring 116 is provided with inside teeth 117 which engage the gears 108, and with teeth 118 which engage the segment 119 which is pivoted on the rod 46. Figs. 2, 3, 7, 9 and 10. The segment 119 is provided with a roller 120 which rides in the cam groove 121 in the other side of the disc 100 from the groove 99. The ring 116 is provided with two plates 122 rigidly attached to it, one on each side, to keep the ring 116 in engagement with the gears 108 and the segment 119.

Also pivoted on the rod 55 are the gears 123 and 124 separated by a washer 125, and meshing with them are the readers 126 and 127 respectively which are guided at their upper ends by the guide 128 integral with the support 4$^a$. Figs. 1 and 2. The reader 126 lies in the plane of the snail 20 and the reader 127 is in the plane of the snail 21. The snail 20 is a triple snail with ten steps on each lobe, one step corresponding to 1 lb., and the snail 21 has three steps corresponding to 0, 10 and 20 lbs. These steps are of such a depth that they allow the readers 126 and 127 to rotate the gears 123 and 124 1/10 of a revolution per step which moves the racks 129 and 130 which mesh with them to a corresponding amount, the other ends of these racks meshing in with type wheels. The readers 126 and 127 have ears 131 and 132 respectively which engage the ends 133 and 134 respectively of the spring 35 which is mounted on the bar 46 and the frame 136 and the arm 137. Integral with the frame 136 is the arm 138 to which is attached the roller 139 which rides in the cam groove 140 in the disc 141 which is keyed to the shaft 50. The other end 142 of the frame 136 operates the lever 78 by means of the extension 143 and the projections 144 and 145. Figs. 3 and 5.

The racks 61, 81, 129 and 130 have an additional set of teeth which mesh with the gears 146 rigidly attached to the type wheels 147 which are pivoted on the rod 148, and farther down the said racks are provided with the pins 149 which, together with the wheels 150 and the type wheels 151 pivoted on the rod 152 form part of the mechanism for multiplying the weight as indicated on the type wheels 147 by the price per pound. These racks are further provided with another set of teeth 153 by which the said racks may be locked in certain positions to line up the type wheels 147. These teeth are V-shaped as shown and are adapted to be engaged by the piece 155 which is slideably supported in the frame 154. The piece 155 is provided with a pointed end 156 which fits into the teeth 153, the other end of said piece being pivoted at the point 157 to the frame 158 which is pivoted on the bar 46. Fig. 1. The frame 158 is actuated at the proper time by the contact of the part 159 of the frame 136 with the ears 160 of the frame 158. This throws the end 156 into the teeth 153 after all the operations have been completed. Excessive rearward motion of the frame 158 is prevented by the contact of the legs 161 with the stop 162, and actuation of the frame 158 in the rearward direction is obtained by the contact of the frame 136 with the finger 163 integral with the frame 158. The spring 164 is provided to prevent accidental motion of the piece 155 during the period in which the frame 158 is free to move of itself and before the frame 136 actuates it.

The segment lever 33 is provided with a shoulder 165 which lies in the path of the reader 13 and by which the said lever 33 is reset when the said reader is returned to its normal position. Fig. 2.

The first tooth 166 on the plate 10 is made long to form a backstop for the reader 14.

The position of the ticket with reference to the type wheels 147 and 151 is shown in Fig. 2 as is also the inking ribbon 168, but the printing mechanism, etc. are not shown as they form no part of the present invention.

The controlling discs 49, 100 and 141 are keyed to the shaft 50 as explained, and these are rotated slowly (say about one revolution in a second) thru one revolution in order to operate the mechanism. These discs are rotated in a counter-clockwise direction in Fig. 2, and about $2/5$ of a revolution serve to complete the operations necessary for reading the scale and transferring this reading to the type wheels. These discs are provided with cam grooves as shown.

Mechanism for so rotating these members is not shown as it does not form part of this invention, and they may be driven directly by a crank, thru suitable means by an operating lever similar to that of an adding machine or automatically by various means.

Fig. 17 shows a device for protecting the scale pointer assembly and other scale mechanism from possible injury which might occur if the weighing mechanism were moved or operated while the pointer 6 was clamped as described and it is merely a flexible drive for the scale pointer and one which will give equally well in either direction. This device is placed somewhere along the rack 1ª where it will not be in the way.

At the point where this device is connected to the rack 1ª the said rack is formed into a round bar 170 on which the yoke 171 is capable of sliding up and down to a limited extent. Rigidly attached to the yoke 171 are the collars 172 against which the springs 173 bear. The other ends of the said springs bear against the collars 174 which slide on the bar 170 and which bear against the collar 175 rigidly attached to the bar 170. They also bear against the lugs 176 integral with the yoke 171. The yoke 171 extends at the lower end into the part 177 which connects to the scale mechanism.

It will be seen that this arrangement allows the yoke 171 and the bar 170 to move relative to each other in either direction but with both springs under some compression, thus making the device a coupling which can spring somewhat but which is not too loose to properly drive the scale pointer.

The guards or guides for holding the various racks into engagement with the the gears with which they mesh have not been shown as they would unnecessarily complicate and confuse the drawings.

The operation of the mechanism is as follows:—

When an article is placed on the weighing platform of the scale it causes the pointer assembly 2 to rotate thru an angle proportional to the weight. After the pointer has come to rest the operating lever (or other device) is operated and this rotates the shaft 50 and the parts keyed thereto which, thru the various grooves in the discs, causes the parts to operate in the following order and manner:—

1. The groove 99 in the disc 100 actuates the segment 119 which turns the ring 116 which in turn rotates the gears 108. This causes the screws 106 to draw the ring 9 in toward the plate 10 and to clamp the end 8 of the pointer 6 between said ring 9 and said plate 10.

2. The groove 48 in the disc 49 rotates the lever 44 and causes the gear 42 to move downward. This causes the racks 39 and 40 to rotate the readers 13 and 14 until they contact with the pointer 6 on either side as shown in Fig. 7. The arrangement of the combination of the gear 42, the racks 39 and 40 together with the gears 19 and 36 is such that this will happen, with a given travel of the gear 42, no matter in what position the pointer 6 may be. Figs. 2 and 13.

3. The depression 141ª in the disc 141 releases the lever 12 which allows the spring 32 to come into play and to move the reader 14 to where the teeth 103 and 104 pass into the path of the teeth 101 and 102, and at the same time it clutches the said reader 14 to the segment 33.

4. The disc 100 actuates the lever 96 thru the groove 121 and this rotates the disc 11 thru 9/10 of a pound as explained. As the disc 11 rotates it causes a tooth 101 to contact with the tooth 103 and to rotate the reader 14 until the tooth 104 contacts with a tooth 102 on the plate 10. Fig. 7. The amount of rotation of the disc 11, the spacing of the teeth and the width of the end of the reader 14 are such that the reader 14 is moved positively thru an angle equal to the fraction of a pound and no more as before explained.

Since the segment lever 33 is rigidly attached to the reader 14 during this period the rotation of the reader 14 causes the segment 51 to rotate the gear 52 and the wheels 53 and 54 rigidly attached thereto, and the motion of rotation will be proportional to the angle thru which the reader 14 has been rotated and which corresponds to the fractions of a pound by which the pointer 6 is ahead of the last whole pound.

The disc 11 carries the piece 85 with it and moves the end 84 away from the lever 62 and the pawl 82 until at the end of its motion the end 84 contacts with the finger 89 on the latch 60 releasing the end 87 from the lever 62 and the pawl 82. Thereupon the pawl 82 drops into the teeth of the wheel 54 and prevents it from overrunning while the lever 62 drops into the path of the teeth on the wheel 53 and allows the pawl 71 to drop into the teeth on the wheel 54.

5. At this time the reader 14 is released from the segment lever 33 and the frame 136 is actuated thru the roller 139 and the groove 140 in the disc 141. This motion causes the rotation of the lever 78 which draws down the lever 62 a distance exactly equal to 9/10 of the distance between the teeth on the wheel 53 as before explained and this rotates the wheels 53 and 54 backward in a direction opposite to that in which they were driven by the segment 51. The extent of this motion corresponds to the number of hundredths of a pound thru which the said wheels had been rotated by the segment 51, and as there are ten teeth on the wheel 53 between each tooth on the wheel 54, it causes the pawl 71 and the segment 73 driven thereby to rotate a corresponding amount, which rotates the gear 80 accordingly and this, thru the rack 81, rotates the proper type wheel to the corresponding number of hundredths of a pound. By the motion of the lever 62 the wheel 54 has been set to a position which corresponds to a whole number of tenths of a revolution and this, thru the rack 61, sets the proper type wheel to correspond to the tenths of a pound on the scale.

The rotation of the frame 136 rotates the springs 133 and 134 (see Fig. 2) and this raises the readers 126 and 127 until they contact with the steps on the snails 20 and 21. These readers cause the racks 129 and 130 to turn the proper type wheels to correspond to the number of whole pounds. At the very end of the movement of the frame 136 the edge 159 contacts with the part 160 on the frame 158 and this causes the end 156 to lock the racks 61, 81, 129 and 130 in such positions that the type wheels are properly lined up. After this, the printing takes place unless the multiplying mechanism is included in the scale in which case the printing is done after the product of the weight by the price per pound has been set into the type wheels.

Since the reader 14 has been moved to the position of the last whole pound before the readers 126 and 127 are raised to contact with the snails 20 and 21, there is always presented to the said readers 126 and 127 the central part of one of the steps on said snails.

After the record has been printed all the parts are returned to their normal positions by the further rotation of the shaft 50 and its attached parts to their initial positions.

It is evident that the reading and printing mechanism can be used by itself to advantage under certain circumstances and it is not necessary always to combine it with the multiplying mechanism.

The reading and printing mechanism described herein is shown as being attached to a scale having an approximately circular dial but it is evident that the same principle may be applied to any scale in which the weight causes a pointer or similar means to move thru a distance, either angular or straight which is proportional to the weight.

This mechanism is shown as attached to a scale but it is evident that it can be applied to the reading of any dial or pointer where it is desirable not to put a load on the pointer operating mechanism.

The mechanism shown reads to pounds and hundredths, but it is evident that the same principle can be applied to read any fraction of a pound, such as ounces or fractions thereof, etc., and that the changes required to do this are merely changes in details and not in principle.

I am aware that scales have been made which, to a certain extent, mechanically read and print the weight and I therefore do not claim such a device broadly, but I do claim:—

1. The combination of a mechanism provided with a deflectible member, means for locking said member in any position, recording and registering means and means for transferring the reading as indicated by said member to said recording or registering means, said means including a reader for reading the position of said member, means for returning said reader to the last whole unit, two snails attached to said reader by which the whole units are transferred to said recording or registering means and a segment thru which is transferred the fractions of a unit to said recording or registering means.

2. The combination of a mechanism having a deflectible member, means for locking said member in any position, a reader for reading the position of said member, means for setting back the reader to the position for the last whole unit, recording and registering means, means attached to said reader for controlling the setting of part of said recording or registering means to the whole units and means attached to the said reader during the time it is being set back as above for transferring the fractions of a unit to the rest of said recording or registering means.

3. The combination of a mechanism having a deflectible member, means for detaining said member in any position, means for reading the position of said member while it is thus detained, a series of recording or registering means, means for moving said reading means back to the last whole unit, means attached to said reading means for controlling the setting of the proper recording or registering means to the whole units and means attached to said reading means during the time it is being moved back to the last whole unit for setting the proper recording or registering means to the fraction of a unit.

4. The combination of a mechanism having a deflectible member, means for setting a second member to the position of said deflectible member, means for moving said second member from the position of the deflectible member back to the position of the last whole unit or other unit, recording or registering means, means controlled by said second member for setting the whole units into said recording or registering means and means controlled by said second member while it is being moved back, for setting the fractions of a unit into the balance of the recording or registering means.

5. The combination of a mechanism having a pointer assembly consisting of two pointers, means for locking said pointer assembly in any position by clamping the end of one of the pointers, a reader rotating in an arc similar to the pointers, a finger attached to said reader and lying in the path of the clamped pointer, two teeth attached to said reader, an outside stationary ring having as many teeth on it as there are units in the capacity of the scale, said ring of teeth lying in the plane of one of said teeth on said reader and capable of being engaged thereby, an inner disc having the same number of teeth which lie in the plane of the other tooth on said reader and capable of being engaged thereby, means for moving said reader so that its said two teeth are placed in the path of the teeth of said ring and said disc, a lever pivoted around the same point as said reader and provided with a gear segment at one end, means for locking said reader to said segment bearing lever so that they can be rotated as tho integral with each other, means for rotating said disc while the teeth of the reader are in the path of the teeth of said ring and said disc so that when one of the teeth on said disc contacts with the tooth on said reader to rotate said reader, the other tooth of said reader contacts with a tooth on said ring, recording or registering means, means for transferring the reading of said reader and parts controlled thereby to the recording or registering means and means for returning all parts to their normal positions.

6. The combination of a mechanism, means for reading said mechanism mechanically, which include a reader and a reader setting lever each attached to a gear; two racks, one for each of said gears; a third gear engaging both of said racks and means for moving said third gear so as to actuate the said racks, the said reader and the said reader setting lever and means for transferring said mechanical reading automatically to a recording or registering means provided for the purpose.

7. The combination of a mechanism having indicating means which move thru an arc, means for reading the movement of said indicating means which include a reader rigidly attached to a gear, a rack engaging said gear, a reader setting lever attached to a second gear, a second rack engaging said second gear, a third gear engaging both of the above mentioned racks near the other end from where the first and second gears engage said racks, means for actuating said third gear so that it actuates the reader and reader setting lever thru the gears attached to them, by means of the said racks to cause the said reader to place itself in the same position as the said indicating means, a series of recording or registering means and means whereby the said reader governs means for moving said recording or registering means so that they show or print a number equal to the weight on the scale.

8. A scale having a deflectible member, means for arresting said member in any position, operating means, means actuated by said operating means for setting a second member to the position of said first named member and means for setting said second named member back to the position of the last whole unit thereby setting suitable recording or registering means to correspond to the position of said deflectible member.

9. Mechanism having a deflectible member, means for arresting said member in any position, a light reader member capable of being automatically set to the same position as said deflectible member, means for setting said reader back to the position of the last whole unit and means controlled by said reader for recording or registering the position of said reader.

10. Means for reading a scale mechanically and automatically by merely operating a member, said means including means for arresting the scale pointer in any position, means for setting a reading member to the position of said scale pointer, stepped snails provided with steps corresponding to the even units rigidly attached to said reading member and positioned thereby, means for reading the pounds thru the medium of said snails at ceretain times, means for setting said reading member back to the position of the last whole unit during which time said reading member sets means for determining the fractions of a unit and sets said snails so that said pounds reading means can contact with the middle of one of said steps on said snails and means for transferring the reading of the units and fractions to suitable recording or registering means.

11. Means for reading a scale provided with a pointer, mechanically by one movement of an operating member, said means including a finger capable of assuming the position of the scale pointer, means for setting back said finger to the position of the last whole unit and means for recording or registering said scale reading as determined by the movement and position of said finger.

12. Means for reading a scale provided with a pointer, mechanically by one movement of an operating member, said means including a finger having two snails operated thereby, said finger being capable of assuming the same position as the scale pointer and of thereafter being set back to the position of the last whole unit; a second finger cooperating with said first named finger when reading the position of said pointer, means whereby said setting back of said finger actuates means for determining the fractions of a unit and means for transferring these movements to show on suitable recording or registering means the reading of said scale.

13. Means for reading a scale provided with a pointer, mechanically said means including a pair of fingers capable of assuming the position of the scale pointer by pinching said pointer between them, means for setting back to the position of the last whole unit one of said fingers and means for recording or registering the reading of said scale as determined by the set back motion and the position of said last named finger.

14. Means for reading a scale provided with a pointer, mechanically said means including two fingers each provided with a gear, two racks each one engaging one of said gears, a third gear engaging both racks, means for actuating said third gear by a fixed amount regardless of the reading of the scale thereby causing said fingers to assume the position of the scale pointer and means controlled by one of said fingers for recording or registering the reading of said scale.

15. Means for reading a scale provided with a pointer, mechanically said means including a finger provided with a gear which is engaged by a rack, a second finger with a gear which is engaged by a second rack, a third gear engaging both racks; means whereby the motion of the said third gear causes said fingers to pinch the end of the scale pointer and set said fingers to the position of said pointer and means whereby the position of said fingers controls recording and registering means which show the amount of the scale reading.

16. Automatic means for reading a scale provided with a pointer, said means including means which assume the position of the scale pointer; means for setting back said second named means to the last whole unit, means connected only during said setting back for setting recording or registering means to correspond to the fractions of a unit, means for recording or registering the number of whole units and means for performing all the operations in the correct sequence by a single operation of an operating member.

17. Means for recording or registering the position of a movable pointer, said means including means for locking said pointer in any position; reading means which include a light finger capable of assuming the position of said pointer, means for resetting said finger and means connected to said finger during said resetting for setting the amount of movement of said movable pointer on suitable recording or registering means.

18. Means for recording or registering the position of a movable pointer or similar member, said means including means for arresting said pointer in any position; two light members capable of assuming the position of said pointer and means for reversing the movement of said light members and during said reversal of transferring to suitable recording or registering means the amount of said reversal.

19. In a dial reading mechanism the combination of a pointer, a differential mechanism, the combination of a pointer, a differential mechanism operating two fingers capable of contacting with said pointer, a series of number bearing members and means for transferring the fractional part of the reading of said dial as shown by said pointer to said number bearing members thru the reversed movement of said differential operating said fingers.

20. In a mechanism for reading the position of a movable member, the combination of a differential mechanism comprising two fingers capable of contacting with said member and a member having a given movement operating said fingers to cause said fingers to make said contact, number bearing members and means whereby the fractional position of said movable member relative to the whole units is shown on said number bearing members thru the reversed movement of said differential.

21. In a mechanism for reading the position of a movable member, the combination of a differential mechanism operating two movable members to cause them to contact with said first named movable member, number bearing members and means whereby the position of said first named movable member is shown on said number bearing members, the position of said first named movable member being read thru said second named movable members by the movement of said differential in one direction and the transfer of this reading to the number bearing members being done by the return of one member of said differential toward its normal position.

22. In a mechanism for reading the position of a movable member, the combination of a differential mechanism actuating two interdependent reading members capable of contacting with said movable member, number bearing members and means whereby the reverse movement of one of said reading members, shows the position of said movable member on said number bearing members.

23. In a mechanism operating a dial the combination of a pointer and driving means therefor, said means including a member in operative contact with said pointer, two springs under some tension pushing in opposite directions against the same stop on a second member capable of driving said first member thru said springs in either direction and thus provide an elastic connection between said pointer and said driving means.

24. In a mechanism for transferring the reading of a dial pointer to recording or registering means, the combination of means for locking said pointer, a reading member capable of assuming the position of said pointer when locked and connecting means therefor whereby the reading of said pointer is transferred to said recording or registering means subsequently to the time said reading member is moved back to the position of the last whole unit.

25. In a mechanism for transferring any fractional reading of a dial pointer to recording or registering means capable of assuming only predetermined fractional positions, the combination of means for arresting said pointer in any position and means for transferring the fraction of a unit as indicated by the pointer to the proper recording or registering means, said transferring means including a reading member capable of being moved first to the position of said pointer and subsequently back to the position of the last whole unit and of moving the fraction setting member of next lower denomination to an amount equal to this movement and means for returning this fraction setting member back to such a position whereby the corresponding recorder is moved to its proper position and thereby sets the fractional recorder of lowest denomination to its proper position.

ANDRÉ KORONSKI.